(12) United States Patent
Mabuchi et al.

(10) Patent No.: US 10,199,136 B2
(45) Date of Patent: Feb. 5, 2019

(54) INSULATING TAPE AND PRODUCTION METHOD THEREOF, STATOR COIL AND PRODUCTION METHOD THEREOF, AND ROTATING ELECTRIC MACHINE

(71) Applicant: MITSUBISHI ELECTRIC CORPORATION, Chiyoda-ku (JP)

(72) Inventors: Takahiro Mabuchi, Chiyoda-ku (JP); Shigeyuki Yamamoto, Chiyoda-ku (JP); Makoto Tsukiji, Chiyoda-ku (JP); Hiroshi Sako, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 126 days.

(21) Appl. No.: 15/110,318

(22) PCT Filed: Nov. 13, 2014

(86) PCT No.: PCT/JP2014/080080
§ 371 (c)(1),
(2) Date: Jul. 7, 2016

(87) PCT Pub. No.: WO2015/114907
PCT Pub. Date: Aug. 6, 2015

(65) Prior Publication Data
US 2016/0329123 A1     Nov. 10, 2016

(30) Foreign Application Priority Data

Jan. 29, 2014 (JP) ................. 2014-014166

(51) Int. Cl.
| | | |
|---|---|---|
| H01B 3/04 | (2006.01) | |
| H01F 5/06 | (2006.01) | |
| H01B 3/32 | (2006.01) | |
| H02K 3/30 | (2006.01) | |
| H01B 19/04 | (2006.01) | |
| H01B 3/18 | (2006.01) | |
| H02K 3/40 | (2006.01) | |
| C09J 163/00 | (2006.01) | |
| H02K 1/04 | (2006.01) | |
| H02K 15/10 | (2006.01) | |
| H02K 15/12 | (2006.01) | |

(52) U.S. Cl.
CPC ............. *H01B 3/04* (2013.01); *C09J 163/00* (2013.01); *H01B 3/185* (2013.01); *H01B 3/32* (2013.01); *H01B 19/04* (2013.01); *H01F 5/06* (2013.01); *H02K 1/04* (2013.01); *H02K 3/30* (2013.01); *H02K 3/40* (2013.01); *H02K 15/10* (2013.01); *H02K 15/12* (2013.01); *C09J 2401/006* (2013.01)

(58) Field of Classification Search
CPC .. H01B 3/04; H01B 3/32; H01B 3/185; H01F 5/06; H02K 3/30; H02K 3/40; H02K 1/04; H02K 15/10; H02K 15/12; C09J 2401/006; C09J 163/00
See application file for complete search history.

(56) References Cited

U.S. PATENT DOCUMENTS

| | | | | |
|---|---|---|---|---|
| 2,650,184 | A | * | 8/1953 | Biefeld ................. A41D 31/02 156/289 |
| 3,867,245 | A | * | 2/1975 | Herman ................. H01B 3/04 428/114 |
| 6,288,341 | B1 | | 9/2001 | Tsunoda et al. |
| 6,991,845 | B2 | * | 1/2006 | Levit ....................... B32B 7/02 174/110 R |
| 2002/0056569 | A1 | | 5/2002 | Tsunoda et al. |
| 2004/0094325 | A1 | | 5/2004 | Yoshida et al. |
| 2007/0222308 | A1 | | 9/2007 | Yoshida et al. |

FOREIGN PATENT DOCUMENTS

| | | | |
|---|---|---|---|
| EP | 1 383 226 A1 | 1/2004 | |
| JP | 9-45133 A | 2/1997 | |
| JP | 2000-58314 A | 2/2000 | |
| JP | 2000-116047 | * 4/2000 | .............. H02K 3/30 |
| JP | 2000-116047 A | 4/2000 | |
| JP | 2002-330562 A | 11/2002 | |
| JP | 2005-199562 A | 7/2005 | |
| JP | 2008-27819 A | 2/2008 | |
| JP | 2009-231352 A | 10/2009 | |
| JP | 2012-175799 A | 9/2012 | |
| JP | 2012-244861 A | 12/2012 | |
| WO | 2010/064603 A1 | 6/2010 | |
| WO | 2013/073496 A1 | 5/2013 | |

OTHER PUBLICATIONS

International Search Report dated Feb. 10, 2015, in PCT/JP2014/080080 Filed Nov. 13, 2014.
Extended European Search Report dated Jun. 6, 2017 in Patent Application No. 14880544.3.

* cited by examiner

*Primary Examiner* — Amina S Khan
(74) *Attorney, Agent, or Firm* — Oblon, McClelland, Maier & Neustadt, L.L.P.

(57) ABSTRACT

An insulating tape having a mica layer, a reinforcing layer having a filler and a fiber reinforcing material laminated on the mica layer, and a cellulose derivative layer laminated on the reinforcing layer is provided. One or more hydroxyl groups in the glucose units of the cellulose derivative are substituted with a functional group such as —$CH_2CH_2OH$ or —$(CH_2CH_2O)_pH$ (where p is any repeating number up to 50). The weight per unit area of the mica ranges from 100 $g/m^2$ to 200 $g/m^2$. The filler has a maximum particle size of 100 μm or smaller and a weight per unit area ranging from 10 $g/m^2$ to 50 $g/m^2$. The insulating tape is useful to form a stator coil insulating layer with high thermal conductivity, with no outflow of a filler to the exterior during production of the stator coil, and with enhanced bonding strength.

7 Claims, 5 Drawing Sheets

INSULATING TAPE AND PRODUCTION METHOD THEREOF, STATOR COIL AND PRODUCTION METHOD THEREOF, AND ROTATING ELECTRIC MACHINE

TECHNICAL FIELD

The present invention relates to an insulating tape used in a stator of a rotating electric machine and a method for producing the insulating tape, a stator coil and a method for producing the stator coil, and a rotating electric machine.

BACKGROUND ART

Stators in rotating electric machines have stator coils accommodated in a plurality of slots that are formed on the inner peripheral side of a stator iron core. Each stator coil is made up of a coil conductor and a stator coil insulating material that covers the coil conductor. The stator coil is produced through winding of an insulating tape, resulting from bonding a fiber reinforcing material such as glass cloth onto a mica sheet, around the coil conductor over multiple turns, and through impregnation with a low-viscosity liquid thermosetting resin composition (insulating varnish) under reduced pressure, followed by press molding so as to yield a predetermined cross-sectional shape. The stator coils are accommodated in two tiers, upper and lower, within the slots. A spacer is inserted between the stator coils, and a wedge for fixing the stator coil is inserted into the open end of each slot, whereby electromagnetic vibration generated by the stator coil during operation of the rotating electric machine is suppressed.

In such stators of rotating electric machines, the coil conductors generate heat derived from load current during the operation of the rotating electric machine. Therefore, this heat is dissipated into a surrounding gas via the stator coil insulating material and the stator iron core. Increasing the thermal conductivity of the stator coil insulating material in this heat transfer path elicits a pronounced effect of enhancing cooling performance, since the thermal conductivity of the stator coil insulating material is much lower than that of the coil conductor or of the stator iron core. It is therefore important to increase the thermal conductivity of the stator coil insulating material in order to increase the output and reduce the size of the rotating electric machine. In particular, higher thermal conductivity in a stator coil insulating material is strongly required in indirectly hydrogen-cooled type rotating electric machines, which are expected to surpass directly water-cooled type rotating electric machines as regards efficiency, operation and maintenance.

Therefore, an insulating tape for rotating electric machine stators has been proposed that has a filler layer containing a scaly hexagonal boron nitride filler of specific orientation ratio, and a mica layer (see Patent Document 1).

Patent Document 1: Japanese Patent Application Laid-Open No. 2012-175799

SUMMARY OF THE INVENTION

Technical Problem

Adhesives are generally used in order to support a filler on an insulating tape. In the production of stator coils, however, the insulating tape is wound around a coil conductor, and is then impregnated with an insulating varnish and heat-cured, to become integrated with the coil conductor. Accordingly, the adhesive for supporting the filler and the insulating varnish that is used for impregnation are required to exhibit good compatibility, and to become integrated with each other during heat curing.

During heating simultaneously with press-molding in the production of stator coils using conventional insulating tapes, however, the filler flows out through gaps in the insulating tape, together with the insulating varnish, towards the ends of the coil conductor in the longitudinal direction. This has been accordingly problematic in that the stator coil insulating material to be obtained cannot exhibit the desired thermal conductivity. A further problem in the production of stator coils using conventional insulating tapes is insufficient bonding between portions of the insulating tape.

The present invention has been created to resolve the abovementioned problems, and it is an objective of the present invention to provide an insulating tape and a production method thereof that allow forming a stator coil insulating layer with high thermal conductivity, with no outflow of a filler supported beforehand on the insulating tape to the exterior during production of the stator coil, and that allow enhancing bonding strength between portions of the insulating tape.

A further object of the present invention is to provide a stator coil with high thermal conductivity and high strength reliability, and a method for producing the stator coil.

Solution to the Problem

The present invention is an insulating tape that includes: a mica layer containing mica, a reinforcing layer, laminated on the mica layer and containing a filler and a fiber reinforcing material, and a cellulose derivative layer laminated on the reinforcing layer, wherein the cellulose derivative layer contains a cellulose derivative in which one or more hydroxyl groups in the glucose units are substituted with a functional group selected from the group consisting of —$CH_2CH_2OH$, —$CH_2CH_2OCH_2CH_2OH$, —$CH_2CH(OH)CH_3$, —$CH_3$, —$CH_2CH_3$, —$NO_2$, —$(CH_2CH_2O)_pH$ (in the formula, p is any repeating number greater than 0 up to 50), —$CH_2COOH$, —$CH_2CH_2COOH$, —$CH_2COOM$ (in the formula, M is Li, Na or K) and —$(CH_2CH_2O)_qCH_2CH(OH)CH_2N^+(CH_3)_2(n\text{-}C_{12}H_{25})X^-$ (in the formula, q is any repeating number from 0 to 50, and $X^-$ is $Cl^-$, $Br^-$, $F^-$or $I^-$), the weight per unit area of the mica ranges from 100 g/m$^2$ to 200 g/m$^2$, and the filler has a maximum particle size of 100 μm or smaller and a weight per unit area ranging from 10 g/m$^2$ to 50 g/m$^2$.

The present invention is also a method for producing an insulating tape, including the steps of: forming a mica layer through sheet-forming of a dispersion containing mica; forming a reinforcing layer by bonding a fiber reinforcing material to the mica layer and then coating the fiber reinforcing material with a slurry that contains a filler having the maximum particle size of 100 μm or smaller; and forming a cellulose derivative layer by coating the reinforcing layer with a slurry that contains a cellulose derivative in which one or more hydroxyl groups in the glucose units are substituted with a functional group selected from the group consisting of —$CH_2CH_2OH$, —$CH_2CH_2OCH_2CH_2OH$, —$CH_2CH(OH)CH_3$, —$CH_3$, —$CH_2CH_3$, —$NO_2$, —$(CH_2CH_2O)_pH$ (in the formula, p is any repeating number greater than 0 up to 50), —$CH_2COOH$, —$CH_2CH_2COOH$, —$CH_2COOM$ (in the formula, M is Li, Na or K) and —$(CH_2CH_2O)_qCH_2CH(OH)CH_2N^+(CH_3)_2$ $(n\text{-}C_{12}H_{25})X^-$ (in the formula, q is any repeating number from 0 to 50, and $X^-$ is $Cl^-$, $Br^-$, $F^-$ or $I^-$), wherein the weight per unit area of the mica is set to a range from 100 g/m² to 200 g/m²; and the weight per unit area of the filler is set to a range from 10 g/m² to 50 g/m².

The present invention is also a stator coil, including: a coil conductor; and an insulating layer obtained by winding the above-described insulating tape around the coil conductor, impregnating the insulating tape with a liquid thermosetting resin, and performing hot-press molding.

The present invention is also a method for producing a stator coil, including the steps of: winding the above-described insulating tape around a coil conductor; and impregnating the insulating tape with a liquid thermosetting resin, and performing hot-press molding.

Advantageous Effects of the Invention

In accordance with the present invention, it is possible to provide an insulating tape and a production method thereof that can form a stator coil insulating layer with high thermal conductivity, with no outflow of a filler supported beforehand on the insulating tape to the exterior during production of the stator coil, and that can enhance bonding strength between portions of the insulating tape.

DESCRIPTION OF EMBODIMENTS

Embodiment 1

Figure 1:
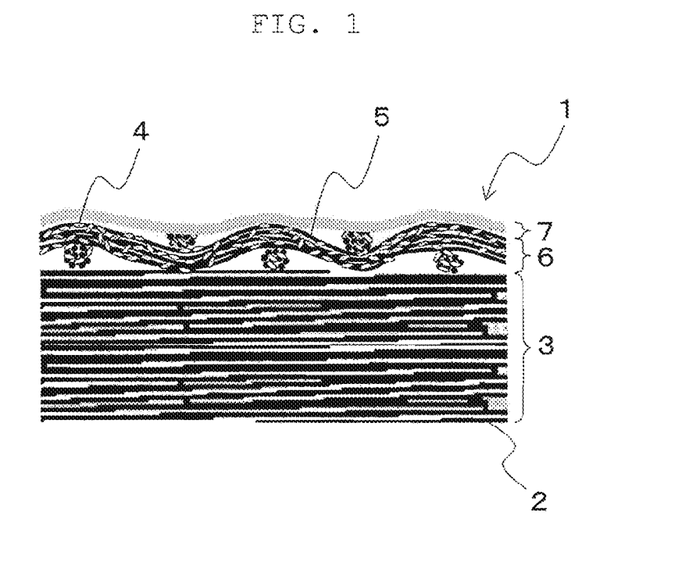
FIG. 1 is a schematic cross-sectional diagram of an insulating tape according to Embodiment 1 of the present invention.

FIG. 1 is a schematic cross-sectional diagram of an insulating tape according to Embodiment 1.

In FIG. 1, an insulating tape 1 has: a mica layer 3 containing mica 2; a reinforcing layer 6 laid on the mica layer 3 and containing a filler 4 and a fiber reinforcing material 5; and a cellulose derivative layer 7 laid on the reinforcing layer 6.

The mica layer 3 contains the mica 2. As the mica 2 there can be used, for instance, hard mica (muscovite) or soft mica (phlogopite) known as types of layered silicate minerals. Examples of the shape of the mica 2 include, for instance, mica blocks, mica splitting, mica paper and the like. The foregoing may be used singly or in combinations of two or more types. Mica paper is preferably used among the foregoing from the viewpoint of thickness homogeneity and low cost.

In addition to the mica 2, the mica layer 3 can contain a resin such as an epoxy resin, a silicone resin, a phenolic resin or the like. The resin can enhance the strength of the mica layer 3 through bonding of the mica 2. When producing a stator coil, the resin is preferably integrated through chemical bonding to an insulating varnish. Accordingly, the type of resin is preferably selected as appropriate depending on the reactivity of the resin with the insulating varnish.

From the viewpoint of the electric insulating properties of the stator coil, the weight per unit area of the mica 2 ranges from 100 g to 200 g, preferably from 140 g to 180 g, per m² of the insulating tape 1. When the weight per unit area of the mica 2 is lower than 100 g/m², desired electric insulating properties are not obtained, and the insulation breakdown time during electric degradation becomes shorter. By contrast, electric insulating properties are good when the weight per unit area of the mica 2 exceeds 200 g/m², but the insulating tape 1 is then thicker, and winding becomes difficult. In a case where the thickness of the insulating layer is fixed, the filling rate of an effective filler for increasing the thermal conduction of the insulating tape 1 is relatively low, and in some instances it may be impossible to form an insulating layer with high thermal conductivity.

The thickness of the mica layer 3 may be set as appropriate depending for instance on the size of the insulating tape 1, but ranges preferably from 40 μm to 180 μm, more preferably from 60 μm to 140 μm.

Examples of the filler 4 include, for instance, alumina, magnesium oxide, zinc oxide, magnesium carbonate, graphite, carbon tubes, boron nitride, titanium boride, silicon carbide, silicon nitride, silica, aluminum nitride and the like. The foregoing may be used singly or in combinations of two or more types. Fillers of different particle size may be combined to increase filling density. Preferred among the foregoing is boron nitride, since the latter has particularly low weight per unit area and can increase the thermal conduction of the insulating layer while preserving electric insulating properties. Primary particles of boron nitride have a layered structure similar to that of graphite, have a scaly particle shape, and exhibit anisotropic thermal conductivity, in that thermal conductivity in the major axis direction is high while thermal conductivity in the minor axis direction is low. Accordingly, when primary particles of boron nitride are used as the filler 4 some variability in the thermal conductivity of the insulating layer may occur on account of the anisotropic thermal conductivity of boron nitride, depending on the production conditions of the insulating tape 1. It is preferable therefore to use, as the filler 4, secondary aggregate particles resulting from aggregation of primary particles of boron nitride, from the viewpoint of preventing variability in the thermal conductivity of the insulating layer caused by the anisotropic thermal conductivity of the primary particles of boron nitride. In particular, an intensity ratio (I<002>/I<100>) of the X-ray diffraction peak of the secondary aggregate particles in the <002> plane with respect to that of in the <100> plane is preferably 15 or lower, from the viewpoint of further suppressing anisotropic thermal conductivity. Stable thermal conductivity independent of the production conditions of the insulating tape 1 can be brought out thus by using such secondary aggregate particles of boron nitride.

A method known in the technical field in question can be used as the method for producing the secondary aggregate particles of boron nitride. For instance, the secondary aggregate particles can be produced through aggregation of primary particles of boron nitride using an inorganic binder. Examples of the inorganic binder include, for instance, boric acid, alkali metal or alkaline earth metal borates (calcium borate, magnesium borate, sodium borate, potassium borate), sodium silicate, aluminum phosphate and the like.

The maximum particle size of the filler 4 is 100 μm or smaller, preferably 80 μm or smaller. When the maximum particle size of the filler 4 exceeds 100 µm, electric insulation characteristics become poorer, since the weight per unit area of the mica 2 that is responsible for the insulation properties needs to be made relatively lower to preclude a large thickness of the insulating tape 1. In the present invention, the cross section size of all particles of the filler 4 contained in images of a tape cross section captured (at 300 magnifications) by SEM or the like (captured region 200 µm×200 µm or more) is measured, this measurement is performed for up to 1000 particles of the filler 4, and the maximum value among the 1000 particles of the filler 4 is denoted as the maximum particle size of the filler 4. Although the maximum value of particle size is set herein to 100 µm, the value is included in the above range, allowing for a margin of error, so long as the effect described in the embodiment is elicited.

The weight per unit area of the filler 4 ranges from 10 g to 50 g, preferably from 10 g to 30 g per m$^2$ of the insulating tape 1, from the viewpoint of a tradeoff between the thickness of the insulating tape 1 and insulation characteristics based on the weight per unit area of the mica 2. The desired thermal conductivity cannot be obtained when the weight per unit area of the filler 4 is lower than 10 g. When on the other hand the weight per unit area of the filler 4 exceeds 50 g, electric insulation characteristics become poorer, since the weight per unit area of the mica 2 that is responsible for the insulation properties has to be made relatively lower to preclude a large thickness of the insulating tape 1.

Examples of the fiber reinforcing material 5 include, for instance, glass cloth, alumina cloth, silica cloth and the like. The fiber reinforcing material 5 is not particularly limited, so long as the strength of the insulating tape 1 can be secured to be comparable to or higher than that of the above cloth types. If the fiber reinforcing material 5 has openings, the latter can be packed by the filler 4, and it becomes possible as a result to curtail increases in the thickness of the insulating tape 1 due to addition of the filler 4, while contributing to increasing the thermal conduction of the insulating layer. The thickness of the fiber reinforcing material 5 is preferably 100 µm or smaller, in terms of electric insulation characteristics. The weight per unit area of the fiber reinforcing material 5 ranges preferably from 10 g to 50 g, more preferably from 10 g to 30 g per m$^2$ of the insulating tape 1.

In terms of preventing outflow of the filler 4 and from the viewpoint of bonding strength between portions of the insulating tape 1, the cellulose derivative layer 7 is formed from a cellulose derivative in which one or more hydroxyl groups in the glucose units are substituted with a functional group selected from the group consisting; of —CH$_2$CH$_2$OH, —CH$_2$CH$_2$OCH$_2$CH$_2$OH, —CH$_2$CH(OH)CH$_3$, —CH$_3$, —CH$_2$CH$_3$, —NO$_2$, —(CH$_2$CH$_2$O)$_p$H (in the formula, p is any repeating number greater than 0 up to 50), —CH$_2$COOH, —CH$_2$CH$_2$COOH, —CH$_2$COOM (in the formula, M is Li, Na or K) and —(CH$_2$CH$_2$O)$_q$CH$_2$CH(OH)CH$_2$N$^+$(CH$_3$)$_2$(n-C$_{12}$H$_{25}$)X$^-$ (in the formula, q is any repeating number from 0 to 50, and X$^-$ is Cl$^-$, Br$^-$, F$^-$ or I$^-$), i.e. a cellulose derivative in which one or more of R$_1$ to R$_3$ in the glucose unit represented by the chemical formula below are substituted with a functional group selected from the group consisting of —CH$_2$CH$_2$OH, —CH$_2$CH$_2$OCH$_2$CH$_2$OH, —CH$_2$CH(OH)CH$_3$, —CH$_3$, —CH$_2$CH$_3$, —NO$_2$, —(CH$_2$CH$_2$O)$_p$H (in the formula, p is any repeating number greater than 0 up to 50), —CH$_2$COOH, —CH$_2$CH$_2$COOH, —CH$_2$COOM (in the formula, M is Li, Na or K) and —(CH$_2$CH$_2$O)$_q$CH$_2$CH(OH)CH$_2$N$^+$(CH$_3$)$_2$(n-C$_{12}$H$_{25}$)X$^-$ (in the formula, q is any repeating number from 0 to 50 and X$^-$ is Cl$^-$, Br$^-$, F$^-$ or I$^-$). Specific examples of cellulose derivatives substituted with such functional groups include, for instance, hydroxyethyl cellulose, hydroxypropyl cellulose, methyl cellulose, ethyl cellulose, nitrocellulose, carboxymethyl cellulose, carboxyethyl cellulose, cationized cellulose and the like. Preferred among the foregoing, from the viewpoint of electric insulation characteristics and workability in a forming process of the cellulose derivative layer 7 during production of the insulating tape, are cellulose derivatives in which one or more hydroxyl groups in the glucose units are substituted with a functional group selected from the group consisting of —CH$_2$CH$_2$OH and —(CH$_2$CH$_2$O)$_p$H (in the formula, p is any repeating number greater than 0 up to 50), and most preferably, the cellulose derivative contains a cellulose derivative in which 1 to 2 hydroxyl groups in the glucose units are substituted with a functional group selected from the group consisting of —CH$_2$CH$_2$OH and —(CH$_2$CH$_2$O)$_p$H (in the formula, p is any repeating number from 2 to 50) (i.e. cellulose derivative in which the degree of substitution by; the foregoing functional groups ranges from 1 to 2). In the chemical formula below, n is preferably a value such that the molecular weight of the cellulose derivative is 10000 or higher, more preferably a value such that the molecular weight ranges from 100000 to 3000000, in terms of stably eliciting a filler outflow prevention effect. The cellulose derivative layer 7 may contain water-soluble polymers other than the above cellulose derivative, so long as the effect of the present invention is not impaired thereby.

Figure 2:
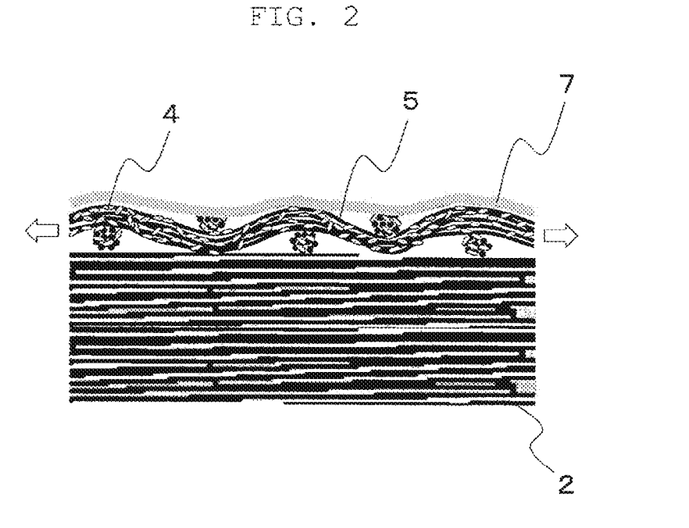
FIG. 2 is a diagram for explaining a state during hot-press molding upon impregnation of an insulating tape according to Embodiment 1 of the present invention with a liquid thermosetting resin composition.

As illustrated in FIG. 2, the cellulose derivative layer 7 is formed so as to cover the filler 4 contained in the reinforcing layer 6; accordingly, there are few outflow paths for the filler 4 contained in the reinforcing layer 6 (the arrows in the figure illustrate the outflow paths for the filler 4), and the insulating varnish is pushed out and migrates out of the system during the production of the stator coil (in particular, during hot-press molding). However, the filler 4 is blocked and rendered immobile by the cellulose derivative layer 7. As a result, the filler 4 remains within the system, and an insulating layer is thus obtained that has the desired thermal conductivity. Therefore, it is important that the cellulose derivative that forms the cellulose derivative layer 7 barely or does not dissolve in the insulating varnish. The filler outflow prevention effect is elicited even if the cellulose derivative layer 7 is a discontinuous layer. The effect can also be elicited even if the filler 4 and the cellulose derivative layer 7 are in a state of being completely separated or mixed with each other. For instance, the reinforcing layer 6 and the cellulose derivative layer 7 may be in a mixed state on the mica layer 3. Generally, epoxy resins, silicone resins, phenolic resins, vinyl ester resins and the like are used as insulating varnishes. The above-described cellulose derivative exhibits high resistance to dissolution in such resins. The above-described cellulose derivative allows not only suppressing filler outflow during press molding, but also enhancing bonding strength between portions of the insulating tape 1, by making peeling between the insulating varnish and the surface of the filler 4 less likely in the stator coil after hot-press molding.

Figure 3:
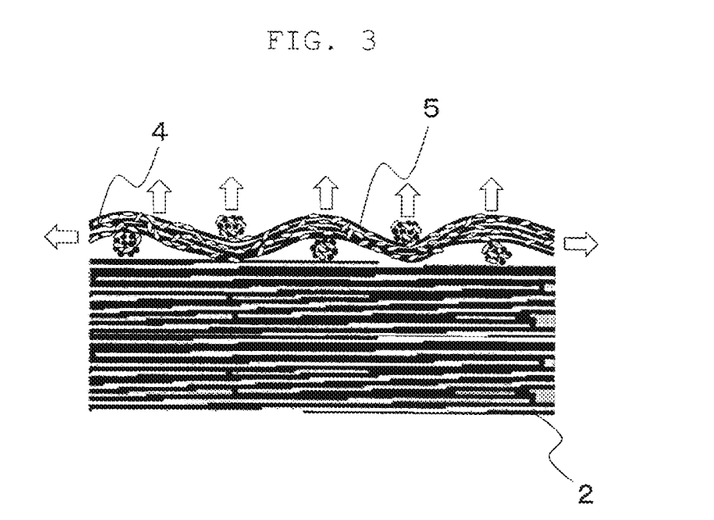
FIG. 3 is a diagram for explaining a state during hot-press molding upon impregnation of an insulating tape, having no cellulose derivative layer formed thereon, with a liquid thermosetting resin composition.

In a case where, by contrast, the cellulose derivative layer 7 is not formed, there are numerous outflow paths for the filler 4 contained in the reinforcing layer 6, as illustrated in FIG. 3 (the arrows in the figure denote outflow paths for the filler 4); the filler 4 flows out thus together with insulating varnish during production of the stator coil (in particular, during hot-press molding), and an insulating layer having the desired thermal conductivity cannot be formed.

The weight per unit area of the cellulose derivative layer 7 ranges preferably from 0.001 g to 5 g, and more preferably from 0.005 g to 1 g, per $m^2$ of the insulating tape 1. The filler outflow prevention effect may fail to be elicited when the weight per unit area of the cellulose derivative layer 7 is lower than 0.001 g. When by contrast the weight per unit area of the cellulose derivative layer 7 exceeds 5 g, the filler outflow prevention effect is enhanced, but compatibility with the insulating varnish decreases and impregnation with the insulating varnish does not readily take place, which gives rise to the concern of occurrence of voids within the insulating layer.

A method for producing the insulating tape 1 will be explained next.

Firstly, a dispersion containing the mica 2 is subjected to sheet-forming, to form the mica layer 3.

The method of preparing the dispersion that contains the mica 2 is not particularly limited, and a method known in the technical field in question can be resorted to herein. For instance, a dispersion can be prepared by dispersing the mica 2 in water. The content of the mica 2 in the dispersion is not particularly limited and may be adjusted as appropriate in accordance with, for instance, the type of the mica 2.

The sheet-forming method of the dispersion is not particularly limited, and a method known in the technical field in question can be resorted to herein. For instance, a mica sheet that constitutes the mica layer 3 can be formed herein through sheet-forming of the dispersion using a commercially available paper machine.

Herein the mica sheet may be bonded to various kinds of separate film as a support material. In a case where the mica sheet is bonded to a support material, a resin composition may be applied to the mica sheet, in accordance with a known method such as roll coating, spraying or the like, followed by bonding to the support material.

Resin compositions that are used for bonding mica sheets and support materials include generally a thermosetting resin, a curing agent and a solvent.

A thermosetting resin known in the technical field in question can be used herein as the thermosetting resin. Specific examples of the thermosetting resin include, for instance, epoxy resins, unsaturated polyester resins, phenolic resins, melamine resins, silicone resins and polyimide resins. Preferred among the foregoing are epoxy resins, since the latter exhibit excellent characteristics, for instance, in terms of heat resistance and adhesiveness. Examples of epoxy resins include bisphenol A epoxy resins, bisphenol F epoxy resin, ortho-cresol novolac epoxy resins, phenol novolac epoxy resins, alicyclic/aliphatic epoxy resins, glycidyl-aminophenol epoxy resins and the like. The foregoing resins may be used singly or in combinations of two or more types.

The curing agent is not particularly limited, and a curing agent known in the technical field in question can be used herein. Specific examples of the curing agent include, for instance, organometallic complexes or organometallic salts of metals such as cobalt, copper, zinc, iron, nickel, manganese, tin and the like. Specific examples of organometallic complexes include, for instance, organocobalt complexes such as cobalt (II) acetylacetonate, cobalt (III) acetylacetonate and the like, organocopper complexes such as copper (II) acetylacetonate, organozinc complexes such as zinc (II) acetylacetonate, organoiron complexes such as iron (III) acetylacetonate; organonickel complexes such as nickel (II) acetylacetonate, and organomanganese complexes such as manganese (II) acetylacetonate. Examples of organometallic salts include, for instance, zinc octylate, tin octylate, zinc naphthenate, cobalt naphthenate, tin stearate, zinc stearate and the like. Preferred among the foregoing are cobalt (II) acetylacetonate, cobalt (III) acetylacetonate, zinc (II) acetylacetonate, zinc naphthenate and iron (III) acetylacetonate, and more preferably cobalt (II) acetylacetonate and zinc naphthenate, from the viewpoint of curability and solvent solubility. The foregoing may be used singly or in combinations of two or more types.

The formulation amount of the curing agent must be set as appropriate in accordance with, for instance, the types of thermosetting resin and curing agent that are used, but ranges ordinarily from 0.1 parts by mass to 200 parts by mass with respect to 100 parts by mass of the thermosetting resin.

The solvent is not particularly limited, and a solvent known in the technical field in question can be used herein. Specific examples of the solvent include, for instance, organic solvents such as toluene, methyl ethyl ketone and the like. The foregoing may be used singly or in combinations of two or more types.

The formulation amount of the solvent is not particularly limited, and may be adjusted as appropriate in accordance with the desired viscosity of the resin composition.

Next, the fiber reinforcing material 5 is bonded to the mica sheet, and thereafter, the fiber reinforcing material 5 is coated with a slurry containing the filler 4, to form the reinforcing layer 6.

The method for bonding the fiber reinforcing material 5 to the mica sheet is not particularly limited, and a method known in the technical field in question can be resorted to herein. For instance, the mica sheet and the fiber reinforcing material 5 may be bonded to each other using a resin composition. Specifically, the fiber reinforcing material 5 is coated with a resin composition, in accordance with a known method such as roll coating, spraying or the like, and the solvent in the resin composition is volatilized, after which the mica sheet is overlaid on the fiber reinforcing material 5. Thereafter, the resulting laminate is heated and pressure-bonded, for instance by hot rolls under heating at a temperature ranging from 60° C. to 70° C.

The slurry that contains the filler 4 is not particularly limited, and for instance a slurry resulting from blending the filler 4 into a resin composition can be used herein. The same resin composition that is used for bonding the mica sheet and the support material can be used as the resin composition that is used in the slurry. The formulation amount of the filler 4 must be set as appropriate in accordance with, for instance, the types of thermosetting resin and curing agent that are used, but ranges ordinarily from 20 parts by mass to 200 parts by mass with respect to 100 parts by mass of the thermosetting resin.

The method for applying the slurry containing the filler 4 is not particularly limited, and a method known in the technical field in question can be resorted to herein. Examples of the coating method include, for instance, spraying, roll coating, gravure transfer and the like.

Next, the reinforcing layer 6 is coated with a slurry containing the cellulose derivative, to form the cellulose derivative layer 7.

The slurry containing the cellulose derivative is not particularly limited, and for instance a slurry resulting from dissolving the above cellulose derivative in a solvent can be used herein.

The solvent is not particularly limited, and a solvent known in the technical field in question can be used herein. Specific examples of the solvent include water, ethanol, ethylene glycol and the like. The foregoing may be used singly or in combinations of two or more types.

The formulation amount of the solvent is not particularly limited, and may be adjusted as appropriate in accordance with the coatability of the slurry.

The method for applying the slurry containing the cellulose derivative is not particularly limited, and a method known in the technical field in question can be resorted to herein. Examples of the coating method include, for instance, spraying, roll coating and the like.

The cellulose derivative layer 7 can be formed by applying the slurry containing the cellulose derivative, followed by heating at a predetermined temperature to volatilize the solvent.

In the insulating tape 1 obtained as described above, the filler 4 contained in the reinforcing layer 6 is covered by the cellulose derivative layer 7. Accordingly, the filler 4 that is supported beforehand on the reinforcing layer 6 does not readily flow out to the outside during production of the stator coil (in particular, during hot-press molding); it becomes thus possible to form an insulating layer with high thermal conductivity, and to enhance bonding strength between portions of the insulating tape 1.

Embodiment 2

Figure 4:
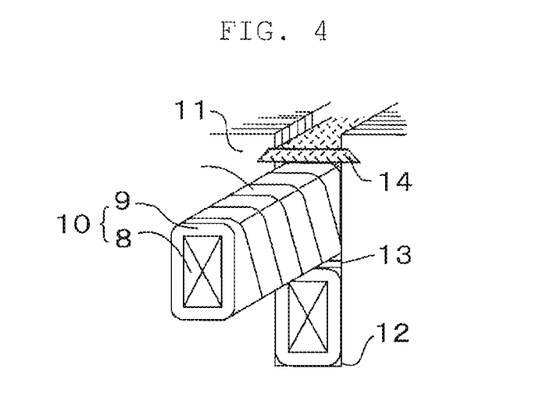
FIG. 4 is a partial enlarged perspective-view diagram of a stator of a rotating electric machine.

A stator coil according to Embodiment 2 of the present invention has a coil conductor and an insulating layer that is integrated with the coil conductor through impregnation of the insulating tape 1 of Embodiment 1, wound on the periphery of the outer periphery of the coil conductor, with a liquid thermosetting resin composition, and heat-press curing of the latter. The characterizing feature of the stator coil of the present embodiment is the insulating tape that is used; otherwise a conventionally known configuration (for instance the configuration illustrated in FIG. 4) can be adopted herein to configure the stator coil. As illustrated in FIG. 4, a stator coil 10 having a coil conductor 8 and an insulating layer 9 are accommodated over two tiers, upper and lower, within each of a plurality of slots 12 that are formed on the inner peripheral side of a stator iron core 11, in the stator of a rotating electric machine. A spacer 13 is inserted between stator coils 10, and a wedge 14 for fixing the stator coil 10 is inserted in the open end of each slot 12.

The stator coil 10 having such a structure is produced as follows.

Firstly, the insulating tape 1 is wound, over multiple turns, around the outer periphery of the coil conductor 8 that is made up by bundling a plurality of insulation-coated wire conductors, in such a manner that part of the insulating tape 1 (for instance, a portion that is half the width thereof) overlaps on itself. The wire that makes up the coil conductor 8 is not particularly limited so long as the wire is conductive, and wire made of copper, aluminum, silver or the like can be used herein.

Next, the insulating tape 1 wound around the coil conductor 8 is impregnated with a liquid thermosetting resin composition. The liquid thermosetting resin composition that is used for impregnation is not particularly limited, but includes generally a thermosetting resin and a curing agent.

As the thermosetting resin there can be used the same thermosetting resin as illustrated in Embodiment 1, but preferably the thermosetting resin that is used barely or does not dissolve the cellulose derivative.

The curing agent is not particularly limited, and a curing agent known in the technical field in question can be used herein. Examples of the curing agent include, for instance, alicyclic acid anhydrides such as methyltetrahydrophthalic anhydride, methylhexahydrophthalic anhydride, himic anhydride and the like; aliphatic acid anhydrides such as dodecenyl succinic anhydride and the like; aromatic acid anhydrides such as phthalic anhydride, trimellitic acid anhydride and the like; organic dihydrazides such as dicyandiamide, adipic acid dihydrazide and the like; tris(dimethylaminomethyl)phenol; dimethylbenzylamine; 1,8-diazabicyclo(5,4,0)undecene and derivatives thereof; and imidazoles such as 2-methylimidazole, 2-ethyl-4-methylimidazole, 2-phenylimidazole and the like. The foregoing curing agents may be used singly or in combinations of two or more types.

The formulation amount of the curing agent must be set as appropriate in accordance with, for instance, the types of thermosetting resin and curing agent that are used, but ranges ordinarily from 0.1 parts by mass to 200 parts by mass with respect to 100 parts by mass of the thermosetting resin.

The impregnation method of the liquid thermosetting resin composition is not particularly limited, and a method known in the technical field in question can be used herein. Examples of impregnation methods include, for instance, vacuum impregnation, vacuum-pressure impregnation, normal-pressure impregnation and the like. Impregnation conditions are not particularly limited, and may be adjusted as appropriate for instance in accordance with the type of the liquid thermosetting resin composition that is used.

After the insulating tape 1 has been impregnated with the liquid thermosetting resin composition, the coil conductor 8 is mold-clamped from outside the insulating tape 1, to exert pressure thereby against the insulating tape 1.

Next, the insulating tape 1 is heated or the like, to thereby cure the liquid thermosetting resin composition with which the insulating tape 1 is impregnated. The stator coil 10 is obtained as a result.

In the stator coil 10 of the present embodiment produced as described above, the filler 4 that is supported beforehand does not readily flow out to the outside during production of the stator coil 10 (in particular, during hot-press molding). Therefore, the thermal conductivity of the insulating layer can be increased, and strength reliability can be enhanced since the bonding strength between portions of the insulating tape 1 is high.

Embodiment 3

Figure 5:
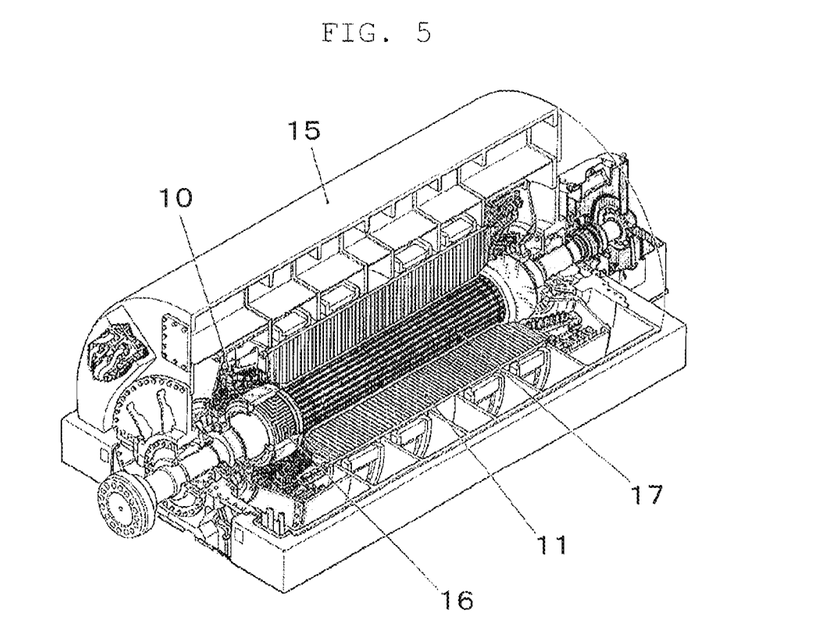
FIG. 5 is a cross-sectional perspective-view diagram of a generator, as an example of a rotating electric machine.

FIG. 5 illustrates a cross-sectional perspective-view diagram of the structure of a generator as an example of a rotating electric machine. As illustrated in FIG. 5, the generator is made up mainly of a stator 15 and a rotor 17. The stator 15 is made up of a stator iron core 11 and a stator coil 10 that is accommodated within a slot of the stator iron core 11. The rotor 17 is made up of a rotor iron core and a rotor coil 16 inserted into the rotor iron core. The stator coil 10 explained in Embodiment 2 is used in this generator.

In the generator of the present embodiment, the filler 4 supported beforehand on the insulating tape 1 does not readily flow out to the outside during the production of the stator coil 10 (in particular, during hot-press molding). Therefore, the thermal conductivity of the insulating layer can be increased, and strength reliability can be enhanced since the bonding strength between portions of the insulating tape 1 is high. Accordingly, the present embodiment allows the temperature of the stator coil insulating material during operation to be lowered below that of conventional generators, and allows the life of the stator coil insulating material to be prolonged. Further, the present embodiment allows peeling between the insulating tapes 1 to be suppressed, and hence allows a highly reliable generator to be provided. The present embodiment is useful in indirectly hydrogen-cooled rotating electric machines from which particularly high thermal conductivity is required.

EXAMPLES

Details of the present invention will be explained next on the basis of examples and comparative examples, but the invention is not limited by these examples and comparative examples.

Example 1

A mica paper powder was dispersed in water, to prepare a dispersion of mica paper powder. Thereafter, the dispersion was subjected to sheet-forming in a paper machine, to yield a mica sheet.

Next, the mica sheet was coated, by roll coating, with a resin composition obtained by dissolving 100 parts by mass of a bisphenol A epoxy resin (trade name: JER (registered trademark) 828, by Mitsubishi Chemical Corporation) and 10 parts by mass of zinc naphthenate in 400 parts by mass of methyl ethyl ketone; a glass cloth, as a fiber reinforcing material, was bonded to the coated mica sheet.

Next, a slurry of a boron nitride powder was prepared by mixing 150 parts by mass of a bisphenol A epoxy resin (trade name: JER (registered trademark) 828, by Mitsubishi Chemical Corporation), 15 parts by mass of zinc naphthenate, a boron nitride powder having the maximum particle size of 5 µm, and 1000 parts by mass of methyl ethyl ketone. The glass cloth surface in the bonded body of the above mica sheet and glass cloth was coated with this slurry by roll coating, and the whole was dried, to form a reinforcing layer containing the boron nitride powder (weight per unit area of boron nitride powder: 20 g/m$^2$).

Next, a slurry resulting from dissolving hydroxyethyl cellulose A (molecular weight: about 300000, degree of substitution by —CH$_2$CH$_2$OH: 1) in water was applied, through spraying, onto the surface of the reinforcing layer, with drying at 80° C., to form a cellulose derivative layer and yield thus an insulating tape having a three-layer structure. In the obtained insulating tape, the content of the mica sheet per m$^2$ of tape was 100 g (weight per unit area 100 g/m$^2$), the content of boron nitride powder was 20 g (weight per unit area 20 g/m$^2$), the content of glass cloth was 20 g (weight per unit area 20 g/m$^2$) and the content of hydroxyethyl cellulose A was 1 g (weight per unit area 1 g/m$^2$). The insulating tape was cut to a width of 30 mm.

Next, the insulating tape was wound 20 times, in a half-overlapping fashion, around a 50×20×7000 mm coil conductor, with the mica layer surface facing the coil conductor. A coil conductor resulting from bundling a plurality of flat insulating wires with Roebel transposition was used herein as the coil conductor. The coil conductor having the insulating tape wound thereon was next impregnated, by vacuum pressure impregnation, with a liquid thermosetting resin composition that contained 100 parts by mass of a bisphenol A epoxy resin (trade name: JER (registered trademark) 828, by Mitsubishi Chemical Corporation) and 90 parts by mass of a methyltetrahydrophthalic anhydride curing agent (trade name: HN-2200, by Hitachi Chemical Co., Ltd.). The whole was press-molded using a jig, to bring the thickness of the insulating tape impregnated with the liquid thermosetting resin composition to 4 mm, and was heated in a drying furnace, to cure the liquid thermosetting resin composition and yield a stator coil as a result.

Examples 2 to 11

In Examples 2 to 11, stator coils were produced and evaluated in the same way as in Example 1, using the materials given in Tables 1 to 3. The molecular weight of the carboxymethyl cellulose in the tables is about 150000, the degree of substitution by —CH$_2$COOH is 2, the molecular weight of the methyl cellulose is about 250000, and the degree of substitution by —CH$_3$ is 1.

Example 12

A stator coil was produced and evaluated in the same way as in Example 1, but herein hydroxyethyl cellulose B (molecular weight: about 230000, degree of substitution by —(CH$_2$CH$_2$O)$_2$H: 1) was used instead of hydroxyethyl cellulose A (molecular weight: about 300000, degree of substitution by —CH$_2$CH$_2$OH: 1).

Example 13

A stator coil was produced and evaluated in the same way as in Example 1, but herein hydroxyethyl cellulose C (molecular weight: about 300000, degree of substitution by —(CH$_2$CH$_2$O)$_6$H: 1) was used instead of hydroxyethyl cellulose A (molecular weight: about 300000, degree of substitution by —CH$_2$CH$_2$OH: 1).

Comparative Example 1

A stator coil was produced and evaluated in the same way as in Example 1, but herein the weight per unit area of the mica sheet was set to 90 g/m$^2$.

Comparative Examples 2 to 7

In Comparative Examples 2 to 7, stator coils were produced and evaluated in the same way as in Example 1, using the materials given in Tables 1 to 3.

The thermal conductivity and insulation breakdown electric field of the stator coils obtained in the examples and comparative examples above were measured as follows.

Thermal conductivity was measured in accordance with the steady-state method prescribed in JIS-A1412. The insulation breakdown electric field was measured in accordance with a short boost method (boost rate 2 kV/second). The results are given in Tables 1 to 3. The physical properties of the insulating materials illustrated in Tables 1 to 3 are values relative to 10 as the thermal conductivity and insulation breakdown value of the stator coil obtained in Example 1.

TABLE 1

|  |  |  | Example 1 | Example 2 | Example 3 | Example 4 | Example 12 | Example 13 | Comparative Example 1 | Comparative Example 2 |
|---|---|---|---|---|---|---|---|---|---|---|
| Constituent materials and weight per unit area ($g/m^2$) of insulating tape | Mica layer | Hard mica paper | 100 | 120 | 180 | 200 | 100 | 100 | 90 | 210 |
|  | Boron nitride | Maximum particle size 5 μm | 20 | 20 | 20 |  | 20 | 20 | 20 | 20 |
|  |  | Maximum particle size 50 μm |  |  |  |  |  |  |  |  |
|  |  | Maximum particle size 100 μm |  |  |  | 20 |  |  |  |  |
|  |  | Maximum particle size 110 μm |  |  |  |  |  |  |  |  |
|  | Cellulose derivative | Hydroxyethyl cellulose A | 1 | 1 | 1 | 1 |  |  | 1 | 1 |
|  |  | Carboxymethyl cellulose |  |  |  |  |  |  |  |  |
|  |  | Methyl cellulose |  |  |  |  |  |  |  |  |
|  |  | Hydroxyethyl cellulose B |  |  |  |  | 1 |  |  |  |
|  |  | Hydroxyethyl cellulose C |  |  |  |  |  | 1 |  |  |
| Thickness of insulating tape (μm) |  |  | 120 | 130 | 150 | 160 | 120 | 120 | 100 | 190 |
| Physical properties of insulating material | Relative value of thermal conductivity |  | 10 | 10 | 11 | 10 | 10 | 10 | 10 | 6 |
|  | Relative value of insulation breakdown electric field |  | 10 | 11 | 13 | 13 | 15 | 14 | 8 | 12 |

TABLE 2

|  |  |  | Example 5 | Example 6 | Example 7 | Example 8 | Example 9 | Comparative Example 3 | Comparative Example 4 | Comparative Example 5 |
|---|---|---|---|---|---|---|---|---|---|---|
| Constituent materials and weight per unit area ($g/m^2$) of insulating tape | Mica layer | Hard mica paper | 120 | 120 | 120 | 120 | 120 | 120 | 120 | 120 |
|  | Boron nitride | Maximum particle size 5 μm | 40 |  |  |  |  |  |  |  |
|  |  | Maximum particle size 50 μm |  | 40 | 50 |  |  |  | 60 | 5 |
|  |  | Maximum particle size 100 μm |  |  |  | 10 | 50 |  |  |  |
|  |  | Maximum particle size 110 μm |  |  |  |  |  | 40 |  |  |
|  | Cellulose derivative | Hydroxyethyl cellulose A | 1 | 1 | 1 | 1 | 1 | 1 | 1 | 1 |
|  |  | Carboxymethyl cellulose |  |  |  |  |  |  |  |  |
|  |  | Methyl cellulose |  |  |  |  |  |  |  |  |
| Thickness of insulating tape (μm) |  |  | 130 | 150 | 155 | 160 | 165 | 170 | 170 | 160 |
| Physical properties of insulating material | Relative value of thermal conductivity |  | 12 | 13 | 13 | 10 | 14 | 11 | 12 | 8 |
|  | Relative value of insulation breakdown electric field |  | 11 | 10 | 10 | 10 | 10 | 8 | 9 | 11 |

TABLE 3

|  |  |  | Example 10 | Example 11 | Comparative Example 6 | Comparative Example 7 |
|---|---|---|---|---|---|---|
| Constituent materials and weight per unit area ($g/m^2$) of insulating tape | Mica layer | Hard mica paper | 120 | 120 | 120 | 120 |
|  | Boron nitride | Maximum particle size 5 μm |  |  |  |  |
|  |  | Maximum particle size 50 μm | 40 | 40 | 40 | 40 |
|  |  | Maximum particle size 100 μm |  |  |  |  |
|  |  | Maximum particle size 110 μm |  |  |  |  |
|  | Cellulose derivative | Hydroxyethyl cellulose A |  |  |  |  |
|  |  | Carboxymethyl cellulose | 2 |  |  |  |
|  |  | Methyl cellulose |  | 5 |  | 6 |
| Thickness of insulating tape (μm) |  |  | 150 | 150 | 150 | 150 |
| Physical properties of insulating material | Relative value of thermal conductivity |  | 12 | 12 | 8 | 6 |
|  | Relative value of insulation breakdown electric field |  | 10 | 10 | 10 | 10 |

In Examples 1, 2, 3 and 4, the ratio of the weight per unit area of mica and the weight per unit area of boron nitride was appropriate, and accordingly both thermal conductivity and the insulation breakdown value were 10 or higher. In Comparative Example 1, by contrast, the weight per unit area of mica responsible for insulation properties was insufficient, and the insulation breakdown value was low. In Comparative Example 2 the insulation breakdown value was high, given the large weight per unit area of mica, but the weight per unit area of boron nitride responsible for thermal conductivity was relatively small, and accordingly thermal conductivity was low.

Examples 5, 6, 7, 8 and 9 and Comparative Examples 3, 4 and 5 offer results of an assessment of maximum particle size and the weight per unit area of boron nitride. In all Examples 5 through 9 the maximum particle size and the weight per unit area of boron nitride were appropriate, and accordingly both thermal conductivity and the insulation breakdown value were 10 or higher. In Comparative Example 3, by contrast, boron nitride having the maximum particle size of 110 μm was used, and accordingly the insulating tape was thick and the proportion of the thickness of the mica layer in the insulating layer was lower, which resulted in a lower insulation breakdown value. In Comparative Example 4 the weight per unit area of boron nitride having the maximum particle size of 50 μm was high and accordingly the insulating tape was thick and the proportion of the thickness of the mica layer in the insulating layer was lower, which resulted in a high thermal conductivity of 12, but with an insulation breakdown value lower than 10.

Thermal conductivity was lower than 10 in Comparative Example 5 on account of the low weight per unit area of boron nitride.

Examples 10 and 11 and Comparative Examples 6 and 7 offer results of an assessment of the type and weight per unit area of the cellulose derivative. In Examples 10 and 11, the boron nitride was held by the cellulose derivative, and accordingly thermal conductivity was 10 or higher. In Comparative Example 6, by contrast, thermal conductivity was low on account of outflow of boron nitride out of the system. In Comparative Example 7 thermal conductivity was low despite the presence of the cellulose derivative. This can be attributed to the fact that impregnation of the liquid thermosetting resin composition is hampered by the cellulose derivative, and to the occurrence of voids within the sample.

Examples 12 and 13 offer results of an assessment of hydroxyethyl cellulose having different repeating numbers of p in $-(CH_2CH_2O)_pH$. Thermal conductivity in Examples 12 and 13 was similar to that of Examples 1 to 4, while the relative values of insulation breakdown electric field exhibited particularly superior characteristics.

The present international application claims priority based on Japanese Patent Application No. 2014-14166, filed on Jan. 29, 2014, the entire contents whereof are incorporated herein by reference.

EXPLANATION ON NUMERALS

1—Insulating tape; 2—Mica; 3—Mica layer; 4—Filler; 5—Fiber reinforcing material; 6 Reinforcing layer; 7—Cellulose derivative layer; 8—Coil conductor; 9—Insulating layer; 10—Stator coil; 11—Stator iron core; 12—Slot; 13—Spacer; 14—Wedge; 15—Stator; 16—Rotor coil; 17—Rotor

The invention claimed is:

1. An insulating tape, comprising:
a mica layer containing mica;
a reinforcing layer laminated on the mica layer and containing a filler and a fiber reinforcing material; and
a cellulose derivative layer laminated on the reinforcing layer,
wherein the cellulose derivative layer contains a cellulose derivative in which one or more hydroxyl groups in the glucose units are substituted with at least one functional group selected from the group consisting of $-CH_2CH_2OH$, $-CH_2CH_2OCH_2CH_2OH$, $-CH_2CH(OH)CH_3$, $-CH_3$, $-CH_2CH_3$, $-NO_2$, $-(CH_2CH_2O)_pH$, in the formula, p is any repeating number greater than 0 up to 50, $-CH_2COOH$, $-CH_2CH_2COOH$, $-CH_2COOM$, in the formula, M is Li, Na or K, and $-(CH_2CH_2O)_qCH_2CH(OH)CH_2N^+(CH_3)_2(n-C_{12}H_{25})X^-$, in the formula, q is any repeating number from 0 to 50, and $X^-$ is $Cl^-$, $Br^-$, $F^-$ or $I^-$,
the weight per unit area of the mica ranges from 100 g/m² to 200 g/m²,
the filler has a maximum particle size of 100 μm or smaller and the weight per unit area ranging from 10 g/m² to 50 g/m², and
the weight per unit area of the cellulose derivative layer ranges from 0.001 g/m² to 5 g/m².

2. The insulating tape according to claim 1, wherein the filler is boron nitride.

3. The insulating tape according to claim 1, wherein the cellulose derivative contains at least one glucose derivative in which 1 to 2 hydroxyl groups in the glucose units are substituted with a functional group selected from the group consisting of $-CH_2CH_2OH$ and $-(CH_2CH_2O)_pH$, in the formula, p is any repeating number from 2 to 50.

4. A method for producing an insulating tape, comprising:
forming a mica layer through sheet-forming of a dispersion containing mica;
forming a reinforcing layer by bonding a fiber reinforcing material to the mica layer and then coating the fiber reinforcing material with a slurry that contains a filler having a maximum particle size of 100 μm or smaller; and
forming a cellulose derivative layer by coating the reinforcing layer with a slurry that contains a cellulose derivative in which one or more hydroxyl groups in the glucose units are substituted with at least one functional group selected from the group consisting of $-CH_2CH_2OH$, $-CH_2CH_2OCH_2CH_2OH$, $-CH_2CH(OH)CH_3$, $-CH_3$, $-CH_2CH_3$, $-NO_2$, $-(CH_2CH_2O)_pH$, in the formula, p is any repeating number greater than 0 up to 50, $-CH_2COOH$, $-CH_2CH_2COOH$, $-CH_2COOM$, in the formula M is Li, Na or K, and $-(CH_2CH_2O)_qCH_2CH(OH)CH_2N^+(CH_3)_2(n-C_{12}H_{25})X^-$, in the formula, q is any repeating number from 0 to 50, and $X^-$ is $Cl^-$, $Br^-$, $F^-$ or $I^-$,
wherein the weight per unit area of the mica is set to a range from 100 g/m² to 200 g/m²,
the weight per unit area of the filler is set to a range from 10 g/m² to 50 g/m², and
the weight per unit area of the cellulose derivative layer is set to a range from 0.001 g/m² to 5 g/m².

5. A stator coil, comprising:
a coil conductor; and
an insulating layer obtained by winding the insulating tape according to claim 1 around the coil conductor, impregnating the insulating tape with a liquid thermosetting resin, and performing hot-press molding.

6. A method for producing a stator coil, comprising:
winding the insulating tape according to claim 1 around a coil conductor; and
impregnating the insulating tape with a liquid thermosetting resin, and
performing hot-press molding.

7. A rotating electric machine, comprising the stator coil according to claim 5 accommodated in a slot of a stator iron core.

* * * * *